INVENTOR.
JONAS THEODORE LINDQUIST
BY
HIS ATTORNEYS

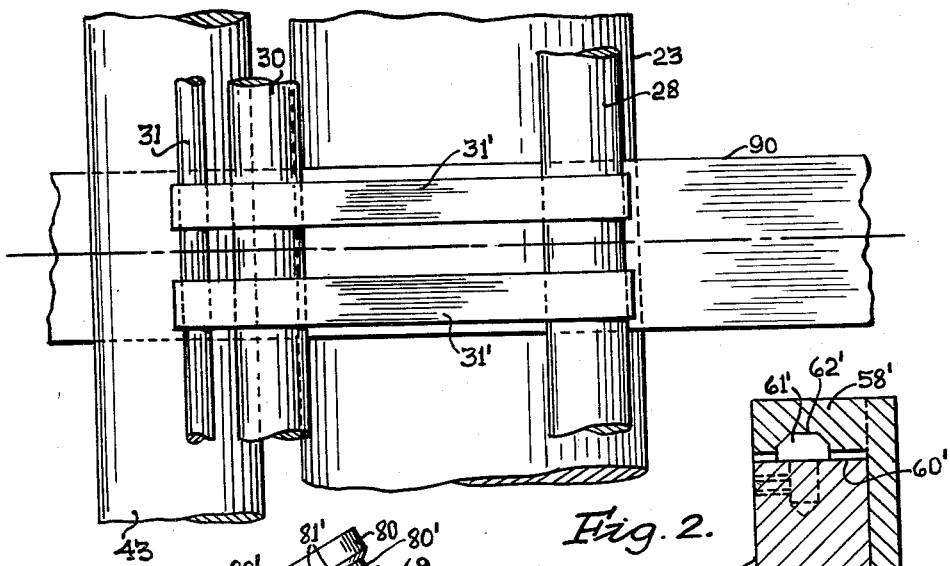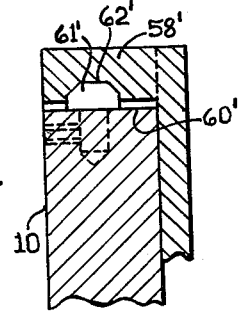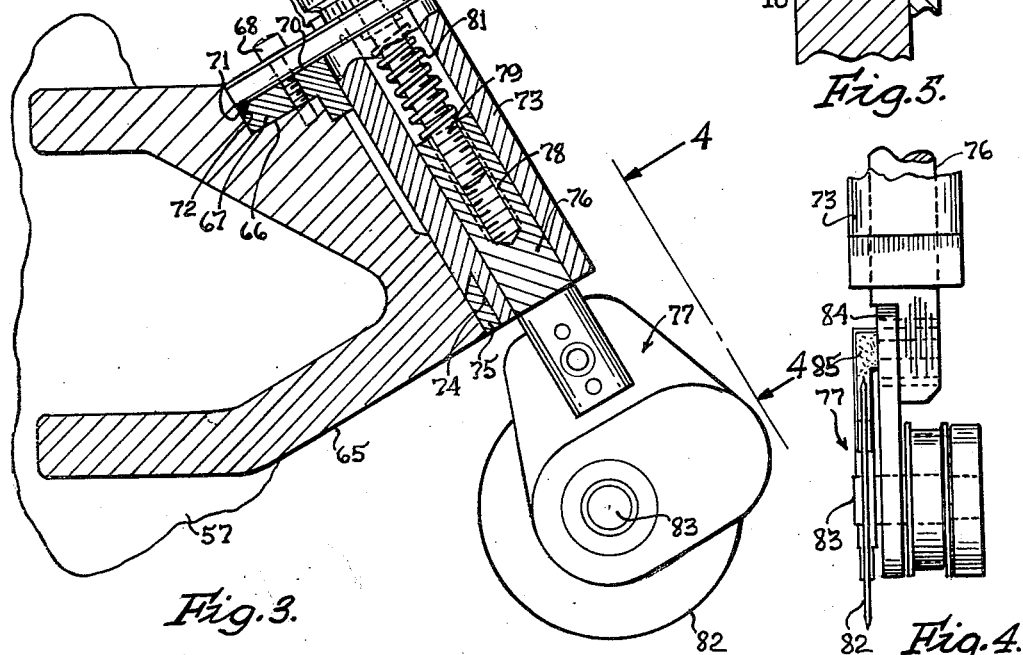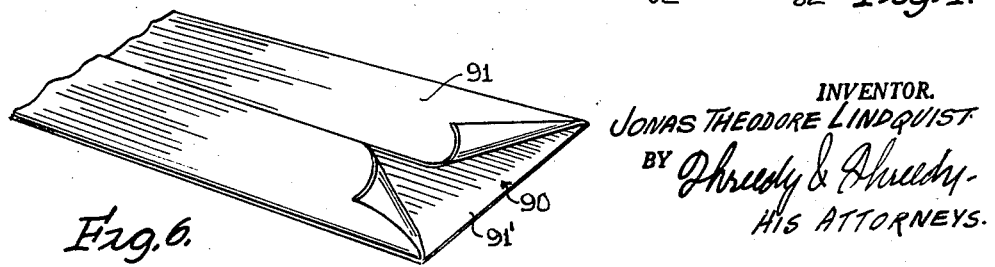

United States Patent Office 3,165,951
Patented Jan. 19, 1965

3,165,951
MACHINE FOR SPLITTING ONE LAYER OF A
LAMINATED WEB OF MATERIAL
Jonas Theodore Lindquist, 7654 Tripp, Skokie, Ill.
Filed Feb. 2, 1962, Ser. No. 171,334
1 Claim. (Cl. 83—12)

My invention relates to a machine for splitting one layer of a laminated web of material.

An object of my invention is to provide a machine for the above-stated purpose which will split one layer of a laminated piece of material without in any way marking or otherwise damaging the remaining or other layer of such material.

Another and equally important object of the invention is the simple and effective arrangement for supporting a splitting knife or knives in a manner such that the splitting operation by the knife will be effective only upon the one layer of a laminated strip or web of material.

Still another object of my invention is the provision of a simple and effective arrangement for holding the laminated strip or web of material firmly upon a backing roller during the splitting operation.

As machines of this type are relatively costly in manufacture, it is an object of this invention to provide such a machine in which there are a minimum number of parts.

A still further object of the invention is the novel arrangement for facilitating threading the laminated strip or web to be split, into and through the machine.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 2 is a sectional detail view taken substantially on line 2—2 of FIG. 1;

FIG. 3 is a vertical sectional detail view through the splitting knife mounting assembly;

FIG. 4 is a fragmentary end view of the same taken substantially on line 4—4 of FIG. 3;

FIG. 5 is a fragmentary sectional detail view taken substantially on line 5—5 of FIG. 1;

FIG. 6 is a fragmentary perspective view of a strip or web of laminated material, one layer of which is illustrated as being split.

Figure 1:
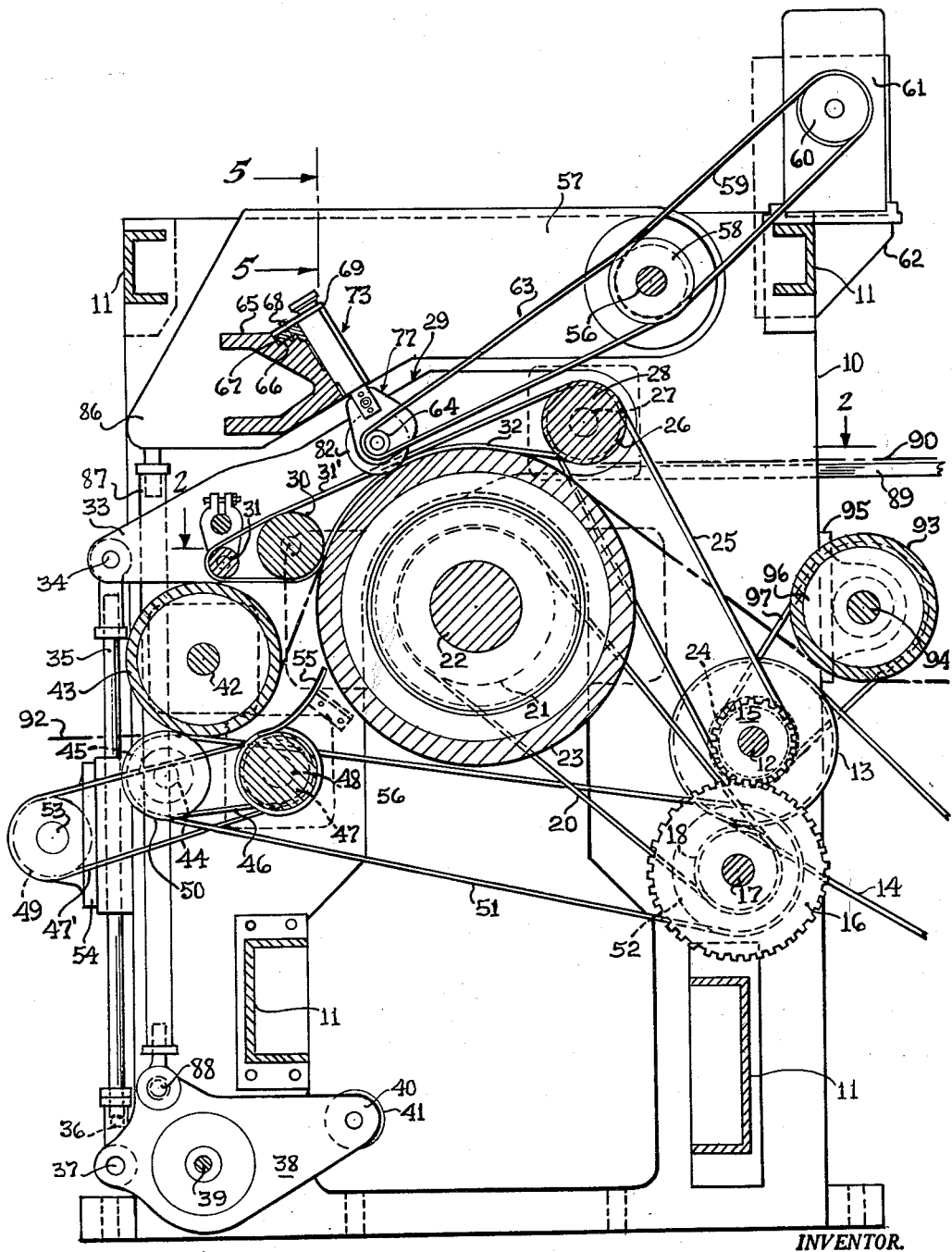
FIG. 1 is a vertical sectional detail view of my invention.

The several objects of my invention are preferably accomplished by the preferred form of construction shown in the accompanying drawings.

In this connection, the machine comprises two end frames 10 rigidly connected in spaced relation with respect to each other by suitable channel bars 11 welded or otherwise attached to the frames 10.

A shaft 12 is supported between the frames and has mounted thereon a grooved pulley 13 which operatively receives a belt 14 driven by a suitable motor (not shown). On the shaft 12 is fixedly mounted a gear 15 which meshes with a gear 16 fixedly mounted on a shaft 17 supported between the frames 10. On the shaft 17 is mounted a grooved pulley 18 which, by means of a belt 20, is connected to a grooved pulley 21 carried by a shaft 22 in turn rotatably supported by the frames 10. The belt 20 transmits rotation to the pulley 21. On the shaft 22 is fixedly mounted between the frames 10 a backing roller 23, the backing roller 23 being caused to rotate by rotation of the shaft 22 when the latter is rotated by the pulley 21 in turn rotated by the belt 20.

On the shaft 12 adjacent the gear 15 is mounted a grooved pulley 24 operatively connected by means of a belt 25 to a grooved pulley 26 mounted on a shaft 27 in turn rotatably supported between the frames 10.

The shaft 27 has fixedly mounted thereon an elongated roller 28 which is preferably of the same length as the backing roller 23. The opposite ends of the shaft 27 provide pivot mountings for a plate 29 extending transversely between the frames 10. Rotatably carried by the plate 29 is a bearing roller 30 and adjacent thereto is an adjustable belt-tightening roller 31. The rollers 30 and 31 are preferably likewise of a length corresponding to the length of the backing roller 23. Extending around the roller 28 over and above the roller 30 and around the roller 31 are a plurality of relatively flat belts 31', the lower run 32 of each bearing upon the cylindrical surface of the backing roller 23. The end 33 of the plate 29 has pivotally connected thereto as at 34, one end portion of a link 35, the opposite lower end portion 36 of the link being pivotally connected to a pivot 37 carried by a pedal 38. The pedal 38 is pivotally carried upon a shaft 39 extending between the frames 10. One end 40 of the pedal 38 carries a roller 41 which is adapted to be engaged by an operating element (not shown) to pivot the pedal 38 about its shaft 39, thereby to impart vertical longitudinal movement to the link 35, with the result that the plate 29 is elevated to a position to disengage the lower run 32 of the belt 31' from engagement with the backing roller 23 to permit feeding of the laminated web or strip to be operated upon, over the upper portion of the backing roller 23.

A rotatable shaft 42 is supported between the frames 10 and on this shaft 42 is mounted a guide roller 43. Supported by one of the frames 10 is a shaft 44 on which there is mounted a grooved pulley 45 having driving connection by means of a belt 46 with a pulley 47 supported for rotation by a shaft 48 extending between the frames 10. On the shaft 44 there is also mounted a grooved pulley 50 having operative connection by means of a belt 51 with a grooved pulley 52 mounted on the shaft 17. The pulley 47 by means of a belt 47' provides driving means for a take-off roller 49 rotatably supported by a shaft 53 mounted on a suitable bearing 54.

Extending longitudinally with respect to the backing roller 23 is a curved deflector plate 55 supported by means of suitable brackets 56 connected to the frames 10.

Extending transversely between the frames 10 is a shaft 56, the ends of which are journaled in the frames 10. The shaft 56 provides a pivot support for a plate 57 disposed in facial abutment with the inside surfaces of the frame 10. On the shaft 56 is a grooved pulley 58 which by means of a belt 59 is connected to a grooved pulley 60 of a reducing gear assembly 61 of any approved construction. The reducing gear assembly is supported from one of the frames 10 by a suitable mounting bracket 62. The pulley 58 is also drivingly connected by means of a belt 63 with a pulley 64 of the splitter assembly which will be presently described.

Extending between the plates 57 is a mounting bar 65. The upper longitudinal edge portion of this bar 65 has a stepped recess 66 in which is mounted an L-shaped bar 67. Connected to this bar 67 by means of a bolt 68 is a supporting plate 69. The underside of this plate 69 has connected thereto a leaf spring 70 having a rolled edge 71 (FIG. 3) which is adapted to fit into a recess 72 provided along one longitudinal edge of the bar 67. This rolled edge 71 yieldably engages in the recess 72 and holds the supporting plate 69 and its associated parts in position while the plate 69 is being attached to the bar 67 by means of bolts 68.

Fixedly attached to and extending from the plate 69 is a sleeve 73 (FIGS. 3-4). The sleeve 73 has a recess 74 formed therein to receive a supporting strip 75 which is fixedly attached to the bar 65. In mounting the sleeve 73 and its supporting plate 69, the strip 75 will, with the cooperation of the spring 70, hold the supporting plate assembly in place until it is fixedly attached to the bar 67 by means of the bolts 68.

Movable in the sleeve 73 is a stud shaft 76, one end of which carries a splitter disc assembly 77. The stud shaft 76 has a threaded socket 78 into which is threaded the shank 79 carried by a finger knob 80. Between the plate 69 and the inner end of the stud shaft 76 is a spring 81. By rotating the finger knob 80, movement will be imparted to the stud shaft 76 to move the same within sleeve 73 against action of the spring 81. The finger knob 80 has a collar 80' which is divided into calibration lines 81' which, in cooperation with an indicating finger 82', will designate the degree of rotation of knob 80.

This arrangement is for adjusting the splitter disc assembly 77 into proper splitting position with respect to the layer of the laminated strip or web of material to be split.

The splitter disc assembly 77 includes a splitter disc 82 rotatably supported by a shaft 83 and a plate 84, on one side of which is arranged a felt cleaning pad 85 operably engaging the peripheral edge of the disc 82 so as to maintain the same in a clean condition and to remove any foreign matter therefrom. See FIG. 4.

The plate 57 at one end portion 86 is connected to a rod 87, the lower end portion of which rod is pivotally connected as at 88 to the pedal 38, the arrangement being such that when the pedal 38 is pivoted in a clockwise direction, upward movement will be imparted to the rod 87 which in turn pivots the plate 57 to elevate the splitter disc assembly 77 a sufficient distance above the backing roller 23 to permit feeding of the laminated strip or web over the backing roller 23. The downward pivotal movement of the plate 57 is limited by a stop flange 58' which overlies the edge 60' of the adjacent frame 10. The frame 10 carries a head-bearing insert 61' (see FIG. 5) which engages into a socket 62' formed in the flange 58'. The arrangement serves to support the end of the plate 57 opposite its pivotal support provided by the shaft 56.

When sheets of laminated paper are to be separately operated upon to split one of the layers thereof, the sheets are supported for movement into the machine by a table 89 of any approved construction and connected in any suitable manner to the frames 10. The laminated sheet indicated at 90 is threaded into the machine by passing the same between the lower run 32 of the belts 31' and the backing roller 23, as best shown in FIG. 2. From the backing roller 23, the laminated sheet passes beneath the roller 43, being guided in that direction by the guide strip 55. From the roller 43, the sheet passes out of the machine. As the sheet 90 is threaded into the machine and as it passes between the lower runs 32 of the belts 31' and the backing roller 23, the upper layer of the laminated sheet is engaged by the splitter disc 82. This splitter disc 82 has been previously adjusted by the operator relative to the backing roller 23 to a position where the splitter disc will only cut through the upper layer of the laminated sheet, splitting the same the full length of the sheet so that the split layer shown at 91 (FIG. 6) may be peeled in two sections from the laminated sheet.

The reducing gear assembly 61 is designed to rotate the splitter disc 82 at a speed sufficient to split the upper layer of the laminated sheet without tearing or otherwise damaging or marking the same. As the lower runs 32 of the belts 31' and the adjacent surface of the backing roller 23 are in contact with each other, they will provide a sufficient means for moving the laminated sheet 90 through the machine.

The threading of the laminated sheet into the machine is greatly facilitated by pivoting the plates 29 and 57 away from the backing roller 23, thereby to provide sufficient space for the operator to readily and conveniently feed the sheet 90 into the machine.

The machine may also be used for the purpose of splitting one layer of a web of laminated paper or other material as the same is unrolled. In this connection, the web from the roll (not shown) is fed beneath a roller 93 rotatably supported by a shaft 94 journaled in suitable bearings 95 carried by the frames 10. On the shaft 94 is mounted a grooved pulley 96 which is driven by a belt 97 extending around the pulley 24. The web of paper or other material is fed beneath the roller 93 and is threaded between the lower runs 32 of the belts 31' and the backing roller 23 beneath the disc 82. From the backing roller 23 the web as seen at 92 extends beneath the roller 43 and thence to a rewind roller (not shown). The splitter disc 82 will operate upon the web and split the adjacent layer of the laminated web in a longitudinal direction as it passes through the machine.

The laminated material, one layer of which is longitudinally split by the machine embodying my invention, may be used for any purpose. As by way of example, the web 90 comprises the two layers 91 and 91' which are removably connected together by a suitable adhesive or the like. It may be desirable after the one layer of the laminated sheet has been split, to cut the laminated sheet transversely into equal segments to be used as labels and which may have printed thereon any desired printed matter. All that is required to apply the label to an object, such as a container or the like, is to flex the label to open the layer which has been split. By doing so, the split edges of such layer will be exposed sufficiently to be grasped by the fingers for removal from its adhesive connection with the unsplit layer, thereby exposing the adhesive for attaching the unsplit label to a container or the like. The above described use is merely one of many uses of the laminated material and is not intended to be construed as a limitation upon the uses to which my invention may be put.

While I have shown in FIG. 2 but one pair of belts 31', it is to be understood that there may be any number of pairs of belts incorporated in the machine, as well as any number of splitter disc assemblies. By such an arrangement, a laminated strip or web of material may have one layer thereof split into several longitudinally extending strips.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A machine for longitudinally splitting one layer of a moving web of laminated layers comprising
 (a) an elongated rotatable backing roller for said web,
 (b) a pair of elongated movable retaining belts arranged in parallel spaced relation with respect to each other and each having their lower run in close proximity to the cylindrical surface of the roller for engagement with the paper web moving between said lower runs and said backing roller,
 (c) a splitting disc assembly including a rotatable splitting disc disposed to engage said web between said belts and arranged tangentially with respect to the cylindrical surface of the backing roller,
 (d) movable means for supporting said splitting disc assembly with the splitting disc disposed between said belts in splitting engagement with respect to said web,
 (e) means operable independently of said movable assembly-supporting means for adjusting said splitting disc in splitting position with the outer layer only of said web and free from contact with the under layer of said web, (f) and means for simultaneously moving said movable splitting-disc-assembly-supporting means and said belts in spaced relation with respect to said backing roller to permit threading of said web over the cylindrical surface of said backing roller.

References Cited in the file of this patent

UNITED STATES PATENTS

| | | |
|---|---|---|
| 527,963 | Gay | Oct. 23, 1894 |
| 974,198 | Smith | Nov. 1, 1910 |
| 1,177,146 | Sheehan | Mar. 28, 1916 |
| 1,281,461 | Wills | Oct. 15, 1918 |
| 1,874,173 | Davis | Aug. 30, 1932 |
| 1,916,596 | Winfree | July 4, 1933 |
| 2,003,404 | Valentine | June 4, 1935 |
| 2,255,019 | Wolters | Sept. 2, 1941 |
| 2,554,683 | Rogers | May 29, 1951 |

FOREIGN PATENTS

| | | |
|---|---|---|
| 1,221,983 | France | Jan. 18, 1960 |